United States Patent [19]

Toida et al.

[11] Patent Number: 5,031,519

[45] Date of Patent: Jul. 16, 1991

[54] HEAT INSULATING COOKING VESSEL

[75] Inventors: Shoji Toida; Kazunori Iwasaki; Yasuhiro Kowa, all of Tokyo, Japan

[73] Assignee: Nippon Sanso Kabushiki Kaisha, Tokyo, Japan

[21] Appl. No.: 508,096

[22] Filed: Apr. 11, 1990

[30] Foreign Application Priority Data

Apr. 11, 1989 [JP] Japan ................ 1-42088[U]
Aug. 25, 1989 [JP] Japan ................ 1-99702[U]

[51] Int. Cl.$^5$ ............... A47J 27/04; A47J 27/10; A47J 27/21; B65D 8/06
[52] U.S. Cl. .................... 99/340; 99/410; 99/417; 126/369; 126/377; 220/408; 220/428
[58] Field of Search .......... 99/339, 340, 403, 410–418, 99/467; 126/369, 377, 376; 220/408, 426, 428, 431, 23.83

[56] References Cited

U.S. PATENT DOCUMENTS

| | | | |
|---|---|---|---|
| 96,518 | 11/1869 | Waterman | 126/377 |
| 100,863 | 3/1870 | Corbett | 126/377 |
| 472,002 | 3/1892 | Ross et al. | 99/340 |
| 1,152,308 | 8/1915 | Evans | 220/428 X |
| 1,299,267 | 4/1919 | Tiers | 126/369 X |
| 1,499,364 | 7/1924 | Goodrick | 126/377 |
| 1,648,725 | 11/1927 | Endicott | 220/408 |
| 1,746,261 | 2/1930 | Keplinger | 126/377 |
| 1,998,920 | 4/1935 | Bremer | 99/340 |
| 4,649,811 | 3/1987 | Manganese | 99/417 |

FOREIGN PATENT DOCUMENTS 14125 9/1892 Fed. Rep. of Germany ...... 126/377
501133 4/1920 France ................................. 99/410

Primary Examiner—Timothy F. Simone
Attorney, Agent, or Firm—Michael N. Meller

[57] ABSTRACT

A heat insulating cooking vessel includes a heat insulating outer container, an inner container which is releasably housed in the outer container, and a heat insulating lid member for closing the opening portion of the outer container when the inner container is housed in the outer container. The inner container is formed shallower than the outer container so that the inner container is positioned below the opening portion of the outer container when housed in the outer container. The side wall of the inner container has at least one handle, each handle being composed of a tang portion extending upward and a grip portion arranged on the tip of the tang portion. The heat insulating lid member of the outer container has at least one cutout into by which the handle of the inner container can be inserted. The heat insulating lid member is releasably disposed to the opening portion of the outer container so that a lower face of the heat insulating lid member is positioned adjacent to the opening portion of the inner container and below the opening portion of the outer container.

6 Claims, 9 Drawing Sheets

HEAT INSULATING COOKING VESSEL

BACKGROUND OF THE INVENTION

1. Field of the Invention

The present invention is related to a heat insulating cooking vessel utilized for a cooking process by which food semi-cooked by heating or cooling is kept warm or cool and brought to a completely cooked state.

2. Prior Art

In general, the process of heating and cooking food involves electrical heat or a direct flame. However, such a cooking process makes food susceptible to breakdown or scorching due to heating, and consumes a large amount of energy.

A cooking process which can solve the above-mentioned problem is desirable, for example one in which vegetables or grains are immersed in a proper quantity of boiling water or boiling seasoned soup, or semi-cooked food is kept warm or cool for an extended period of time to bring it to a completely cooked state.

Figure 11:
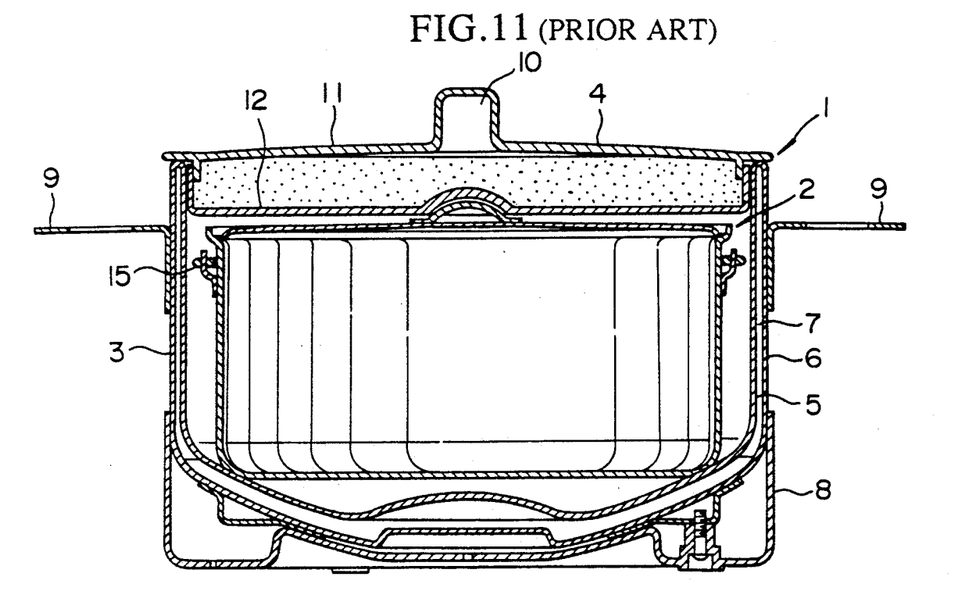
FIG. 11 is a cross sectional view of a prior art heat insulating cooking vessel.

As a cooking vessel suitable for such a cooking process, the heat insulating cooking vessel shown in FIG. 11 has been conventionally proposed.

The heat insulating cooking vessel is composed of a heat insulating container 1, a container portion 3, an inner pot 2 releasably housed in the container portion 3, and a lid portion 4 disposed on the container portion 3, which can be sealed up.

The container portion 3 consists of an inner bottle 5 which is cylindrical and has an approximately hollow curve shaped bottom and an outer bottle 6 which has a larger diameter than that of the inner bottle 5 and has approximately the same shape as the inner bottle 5, both bottles being jointed airtight at their respective upper edges to form a dual wall structure. The space between the inner bottle 5 and outer bottle 6 is either a vacuum space or is filled with heat insulating material to form a heat insulating portion 7. A bottom element 8 is disposed on the bottom of the container portion 3, and handles 9, 9 are disposed on both sides of the container portion 3. The lid portion 4 is formed with an upper lid element 11 of an approximately disc shape and having a lid grip 10 at its center, and with a lower lid element 12 also of an approximately disc shape, the space between the upper lid element 11 and the lower lid element 12 being filled with heat insulating material.

Figure 12:
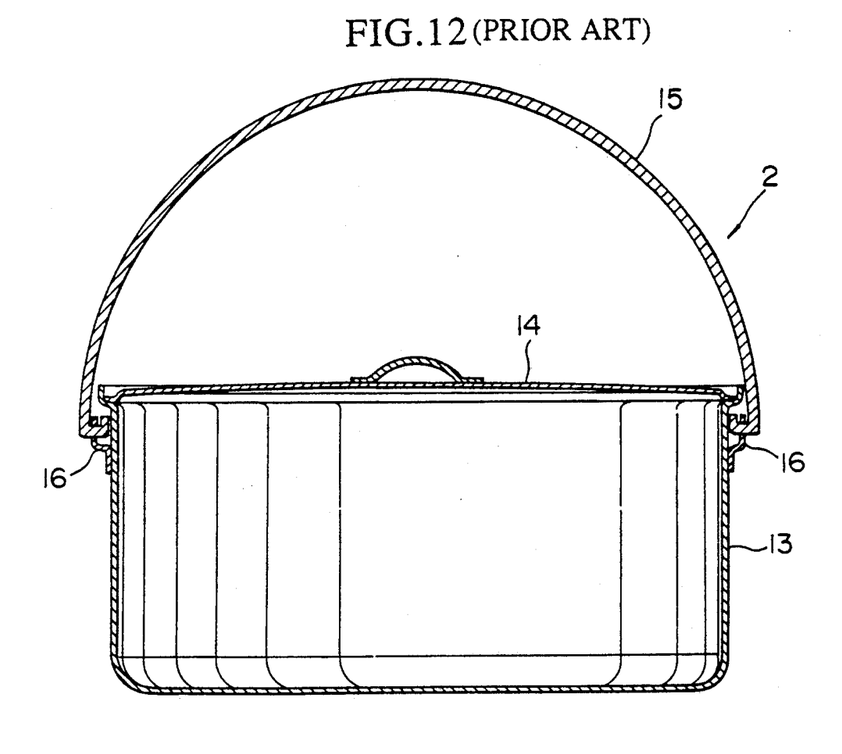
FIG. 12 is a cross sectional view of an inner pot of the prior art heat insulating cooking vessel shown in FIG. 11.

An explanation is given of the inner pot 2 housed in the heat insulating container 1 referring to FIG. 12. The inner pot 2 is equipped with an inner pot container portion 13, an inner pot lid portion 14 and a hanger portion 15. On the upper edge of the inner pot container portion 13 is placed a disc-shaped inner pot container lid portion 14 with the same diameter as that of the container portion 13. Stopper portions 16, 16 are located on the outer peripheral wall of the inner pot container portion 13 so as to engage with the both ends of the hanger portion 15. The hanger portion 15, which is semi-circular shaped and has approximately the same diameter as that of the inner pot container portion 13, are rotatable with respect to the inner pot container portion 13.

Figure 13:
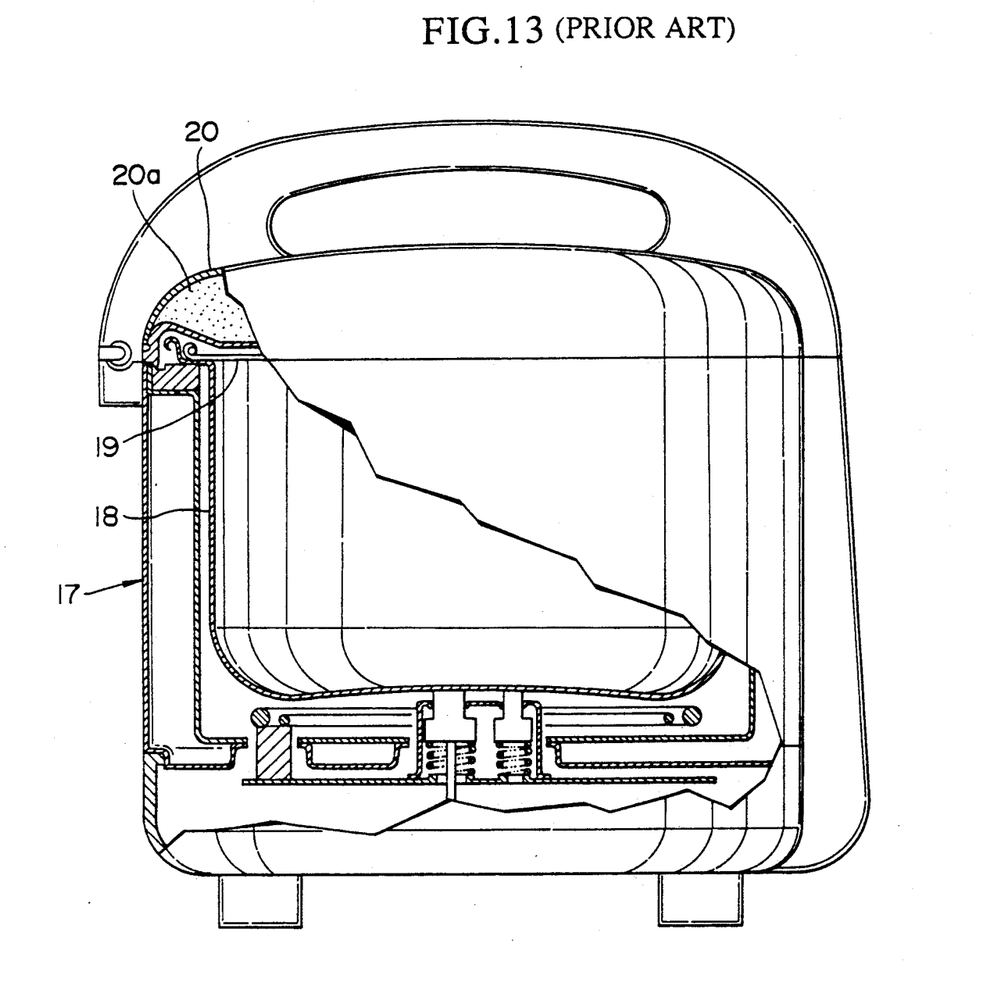
FIG. 13 is a partial cross sectional view of another prior art heat insulating cooking vessel.

FIG. 13 shows the structure of a rice cooker pot as disclosed in Japanese Patent Application Second Publication No. 62-44482. This rice cooker pot consists of a heat insulating pot 17 and a cooking pot 18 with a lid, which are housed releasably in the jar. The lid 19 is placed on the opening of the cooking pot 18 positioned flush or above the upper edge of the heat insulating pot 17. The lid element 20 filled with heat insulating material is positioned above the lid 19 of the cooking pot.

However, these conventional heat insulating cooking vessels have the following problems.

Referring to the heat insulating cooking vessel shown in FIG. 11, the hanger portion 15 of the inner pot 2 is disposed near the opening on the outer surface of the inner pot container portion 13, rotatable with respect to the container portion 13, and is circular with approximately the same curvature as that of the inner pot container portion 13. Therefore, when food is semi-cooked in the inner pot 2 prior to keeping the semi-cooked food warm or cool in the heat insulating container 1, the hanger portion 15 shifts its position relative to the inner pot container 13, thus making it difficult to stir the food in the pot 2. Furthermore, when the inner pot 2 is heated by a heating device such as a gas stove and the like, its heat is convected to the hanger portion 15, resulting in danger to a person who touches the hanger portion 15.

In addition, when the inner pot 2 is housed in the heat insulating container 1, the hanger portion 15, which is rotatable with respect to the container portion 13, may have the bottom portion of the inner pot container portion 13 touch the opening of the heat insulating container 1, so that the inner pot container portion 13 is tilted to cause food in the container to spill out.

Furthermore, when the inner pot 2 is housed in the heat insulating container 1 and cooking is performed by keeping the food either warm or cold, the hanger portion 15 is also housed in the heat insulating container 1. Therefore, the hanger portion 15 is heated, so that it is too hot for a person to touch, thus making it difficult to take the inner pot 2 out of the heat insulating container 1.

In addition, as the hanger portion 15 protrudes from the outer surface of the inner pot container portion 13, the dimensions of the heat insulating container 1 should be large to incorporate the protrusion, causing a higher production cost and preventing the cooking vessel from being lightweight and compact.

In the rice cooker pot shown in FIG. 13, as the lower surface of the lid element 20 is positioned above the upper edge of the heat insulating pot 17, or in other words, the insulating material 20a in the lid element 20 is positioned above the upper edge of the heat insulating pot 17, the insulating performance is reduced.

Furthermore, a structure in which no hanger is provided in the cooking pot (inner container) will reduce the ability to put in or take out the inner pot and to cook using the inner pot, unless the vessel is limited only to cooking rice, which is usually served directly from the inner pot.

SUMMARY OF THE INVENTION

It is therefore an object of the present invention to provide a heat insulating cooking vessel utilized for a cooking process by which food semi-cooked by heating or cooling is kept warm or cool and brought to a completely cooked state.

According to an aspect of the present invention, there is provided a heat insulating cooking vessel including an heat insulating outer container, an inner container which is releasably housed in the outer container, and a heat insulating lid member closing the opening portion of the outer container when the inner container is housed in the outer container, the heat insulating cooking vessel comprising:
  at least one handle disposed on the side wall of the inner container, the handle being composed of a tang portion extending upward, and a grip portion arranged above the opening portion of the inner container on the tip of the tang portion;
  wherein the inner container is formed shallower than the outer container so that the inner container is positioned below the opening portion of the outer container when housed in the outer container; and
  wherein the heat insulating lid member of the outer container is provided with at least one cutout into which the handle can be inserted, the heat insulating lid member being releasably disposed to the opening portion of the outer container so that a lower face of the heat insulating lid member is positioned adjacent to the opening portion of the inner container and below the opening portion of the outer container.

DETAILED DESCRIPTION OF THE INVENTION

A heat insulating cooking vessel according to the present invention includes a heat insulating outer container, an inner container which is releasably housed in the outer container, and a heat insulating lid member closing the opening portion of the outer container when the inner container is housed in the outer container. The inner container is formed shallower than the outer container so that the inner container is positioned below the opening portion of the outer container when housed in the outer container. The side wall of the inner container has at least one handle, each handle being composed of a tang portion extending upward and a grip portion arranged above the opening portion of the inner container on the tip of the tang portion. The heat insulating lid member of the outer container has at least one cutout by which the tang portion of the inner container can be inserted. The heat insulating lid member is releasably disposed to the opening portion of the outer container so that a lower face of the heat insulating lid member is positioned adjacent to the opening portion of the inner container and below the opening portion of the outer container.

In addition, the inner container has a reduced diameter portion formed adjacent to the opening portion thereof, the handle being secured to the reduced diameter portion.

Furthermore, the handle disposed on the side wall of the inner container is extended upwardly so that the tip of the tang portion is positioned outward of the opening portion of the outer container.

The grip disposed on the tip of the tang portion is made of material having low heat conductivity such as synthetic resin and wood and the like.

In addition, the inner container is made of metal or enameled material which can be subjected to heating, in which the heat insulating outer container consists of a dual wall composed of an inner bottle and an outer bottle having an outer wall and a bottom, the inner bottle and the outer bottle being made of metal, and in which further comprising a cover of synthetic resin material disposed at least at the bottom of the outer wall of the outer bottle.

With the present heat insulating cooking vessel, the inner container of the heat insulating container can be put in and taken out using the jointed handle composed of the tang and the grip on the inner container body by arranging the grip at a position above the upper edge of the inner container body.

In addition, when the heat insulating lid member is closed with the inner container housed in the heat insulating container, the lower surface is positioned so that it is below the upper edge of the heat insulating container, thereby enhancing the insulating efficiency, which is the most important function of a heat insulating cooking vessel.

Furthermore, as the inner container has the reduced diameter portion on the upper part of the inner container body and the handle is located in the reduced diameter portion, a space is available to house the tang portion when the inner pot is placed in the heat insulating container.

Furthermore, synthetic resin on the bottom member of the outer container greatly facilitates coloring the bottom member.

Specific explanations are given in this section concerning the present heat insulating cooking vessel by referring to the embodiments.

EMBODIMENT 1

Figure 1:
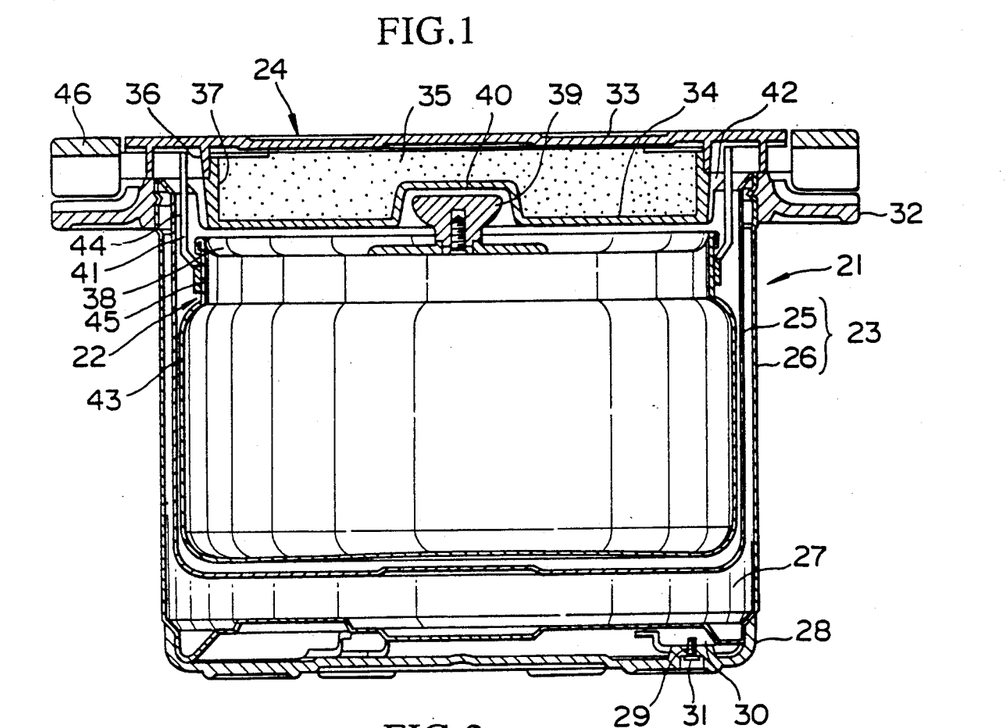
FIG. 1 is a cross-sectional view of a heat insulating cooking vessel according to a first embodiment of the present invention.

FIG. 1 is a drawing for the first embodiment (Embodiment 1) of a heat insulating cooking vessel accoding to the present invention.

The heat insulating cooking vessel of this embodiment consists summarily of a heat insulating container 21 and an inner pot 22 which is housed releasably in the heat insulating container 21. The heat insulating container 21 consists of a heat insulating lid member 24 disposed enclosably on an outer container 23.

The outer container 23 is composed of a cylindrical inner bottle 25 made of stainless steel or carbon steel and a cylindrical outer bottle 26 made of the same material as that of the inner bottle 25 and having a diameter larger than that of the inner bottle 25. The inner bottle 25 and the outer bottle 26 form a dual wall structure with the respective upper edges of the bottles joined in an airtight manner. A heat insulating portion 27 consisting of a vacuum or filled with insulating material is formed in the space between the inner bottle and the outer bottle. A bottom member 28 is located at the bottom of the outer container 23 by screwing a screw 31 into a screw hole 29 drilled in the bottom member 28 along with a screw receiver 30 provided in the outer bottle 26. An outer container handle 32 is fixed onto the upper edge of the outer container 23.

The heat insulating lid member 24 consists of an upper lid element 33 of approximately disc shape, a lower lid element 34 of approximately disc shape, and insulating material 35. The upper lid element 33 and the lowe lid element 34 are jointed by an upper engaging element 36 which projects in the vicinity of circumference of the upper lid element 33 into a lower engaging element 37 which is formed in the vicinity of the circumference of the lower lid element 37. The gap formed by the upper lid element 33 and the lower lid element 34 is filled with insulating material 35. A concave portion 40 is formed at the center of the lower lid element 34 in order to house a knob 39 fixed on an inner pot lid 38 of the inner pot 22.

The heat insulating lid member 24 is formed so that the lower face of the heat insulating lid member 24 is positioned above tha upper edge of the outer container 23 when the heat insulating lid member 24 is closed with the inner container 22 housed in the outer container 23. Furthermore, two cutouts 42 are provided on the side wall of the heat insulating lid member 24 in order to take out tang portions 41 provided on the side wall of the inner pot 22 to outside the outer container 23.

The inner pot 22 is composed of an inner pot body 43, an inner pot lid 38 and two handles 44, 44. On an upper mouth part 45 of the inner pot body 43 is placed the disc-shaped inner pot lid 38 with a diameter approximately the same as that of the mouth part 45. The center of the inner pot lid 38 is fixed to the knob 39 made of a material having low heat conductivity, such as plastics and the like.

The inner pot body 43 made of metal is formed cylindrically with a flat bottom, and the small diameter mouth part 45 is formed on the top of the inner pot body 43. On the circumference of the mouth part 45, two handles 44, 44 are located at one point and at another point corresponding to the other end of the diameter from passing the center of the circumference of the mouth part 45.

The handle 44 consists of the tang portion 41 and the grip portion 46. One end of the tang portion 41 is jointed to the inner pot body 43 by means of welding, and the other end of the tang portion 41 is disposed with the grip portion 46. The tang portion 41 is made of an oblong stainless steel sheet and fixed at the mouth part 45 of the inner pot body 43. The tang portion 41 is extending upward and is bent out perpendicularly at its half point of the circumference of the mouth part 45. As the tang portion 41 is subjected to shock and load when the inner pot 22 is heated, the tang portion 41 is made of stainless steel which has high heat resistance and mechanical strength.

The grip portion 46 fixed on the tip of the tang portion 41 is made of a material having low heat conductivity, such as wood, thermosetting resin, and the like, so that even when the tang portion is heated to a temperature higher than a person can safely touch, the grip portion 46 is kept at a temperature a person can touch.

As the tang portion 41 is located on the circumference of the mouth part 45 with a smaller diameter, a gap is available to house the tang portion 41 when the inner pot 22 is housed in the heat insulating container 21. The inner diameter of the heat insulating container 21 can be set to match the outer diameter of the inner pot body 43. In addition, when the inner pot 22 is housed in the heat insulating container 21 the handle grip portion 41 projects upward from the inner bottle 25 passing through the cutout 42 formed on the heat insulating lid member 24. The tang portion 41 is perpendicularly bent radially outward from the inner pot 22, at the end of which the grip portion 46 is positioned above the upper edge of the inner pot body 43 and radially outward of the inner pot 22. Furthermore, the grip portion 46 is engaged in the outer container handle 32 of the heat insulating container 21.

Thus, by having the tang portion 41 project above the inner pot body 43 and bent outward so that the grip portion 46 is located on the tip of the tang portion 41 and by having the grip portion 46 distanced from the side wall of the inner pot body 43, the heat rising along the side wall of the inner pot body 43 when cooking is performed will not be conducted directly to the grip portion 46, preventing it from being heated to an unacceptable temperature.

In the meantime, using clad steel having high heat conductivity as the material of the inner pot 22 results in more even heating (soaking) in the inner pot and reduces scorching of cooking food. However, if clad steel is used in the tang portion 41, heat conduction of the tang portion 41 is increased, resulting in reducing an insulation performance due to the fact that the tip of the tang portion 41 projects outside the heat insulating container 21. Therefore, it is desirable to use stainless steel for the tang portion 41, which is welded to the mouth part 45 of the inner pot 22 made of clad steel to make both parts into one piece. Using stainless steel as the material of the tang portion 41, which has a lower heat conductivity than does clad steel reduces the heat diffusing from the tang portion 41, thus preventing the heat insulation performance from decreasing.

In this embodiment, one can carry the inner pot 22 by holding the grip portion 46, which is not heated because the grip portion 46 of the handle 44 is outside the heat insulating container 21 when the inner pot 22 is housed in the heat insulating container 21. Additionally, as the grip portion 46 is made of a material having low heat conductivity, such as wood or thermosetting resin, the grip portion 46 will not become too hot to carry it even if the heat in the tang portion 41 is conducted. Furthermore, because the grip portion 46 is positioned above and radially outward of the inner pot body 43, the grip portion 46 will not be heated even if the inner pot 22 is subjected to direct heating, thereby enabling one to carry the inner pot 22 by holding the grip portion 46.

Furthermore, as the grip portion 46 is positioned above and radially outward of the inner pot body 43, putting in and taking out the inner pot 22 from the heat insulating container 21 is easier, thus making the vessel easier to use.

Furthermore, as the lower face of the heat insulating lid member 24 is positioned below the upper edge of the heat insulating container 21, when the heat insulating lid member 24 is closed with the inner pot 22 housed in the heat insulating container 21, it is possible to enhance the heat insulating efficiency, which is the most important function in a heat insulating cooking vessel.

Furthermore, because the mouth part 45 having the reduced diameter portion is formed on the top of the inner pot body 43 and the tang portions 41, 41 are provided on the mouth part 45, a gap is available to house the tang portion 41. The inner diameter of the heat insulating container 21 can be matched with the outer diameter of the inner pot body 43, thereby making it possible to make the heat insulating container 21 more compact.

EMBODIMENT 2

Figure 2:
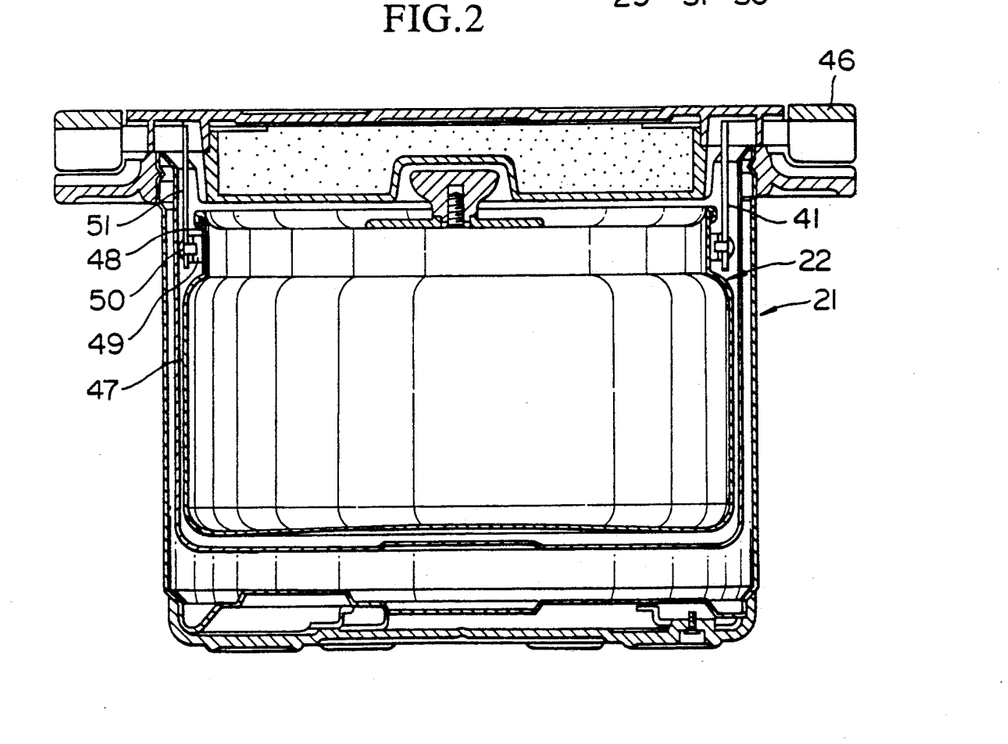
FIG. 2 is a cross sectional view of a heat insulating cooking vessel according to a second embodiment of the present invention.

FIG. 2 is a drawing for a second embodiment (Embodiment 2) of the present heat insulating cooking vessel.

This embodiment differs from Embodiment 1 in that a mouth part 48 of an inner pot body 47 made of enameled iron is fixed with fixing means (fixing hardware 49) by means of a rivet 50 or welding, to a handle 51 made of heat-resistant resin such as thermally hardening resin and the like by interposing the handle 51 between the rivet 50 and the fixing hardware 49. The handle 51 consists of the tang portion 41 and the grip portion 46 formed in one piece using the same material, which is heat-resistant resin.

In this embodiment, which has the same effect as Embodiment 1, the structure of the handle 51 being disposed by interposing the fixing hardware 49 fixed on the inner pot body 47 enables the mouth part 48 and the handle 51 to be joined without using a weld. Therefore, it is possible to use enameled iron for the inner pot body 47 and heat-resistant resin for the handle 51, thus broadening the freedom for selecting material for the inner pot body 47 and the handle 51.

In addition, the use of enameled iron having higher heat conductivity in the inner pot body 47 can reduce scorching of the cooking material and prevent the inconvenience of dissolving metallic material from the inner pot body 47. Moreover, coloration of the inner pot 22 is easier, with greater color variations.

Furthermore, the structure of the inner pot body 47 with the handle 51 made of resin which is far less heat conductive than metal can reduce the heat transfer by conduction from the inner pot body 47 to the grip portion, further enhancing the heat insulating efficiency.

EMBODIMENT 3

Figure 3:
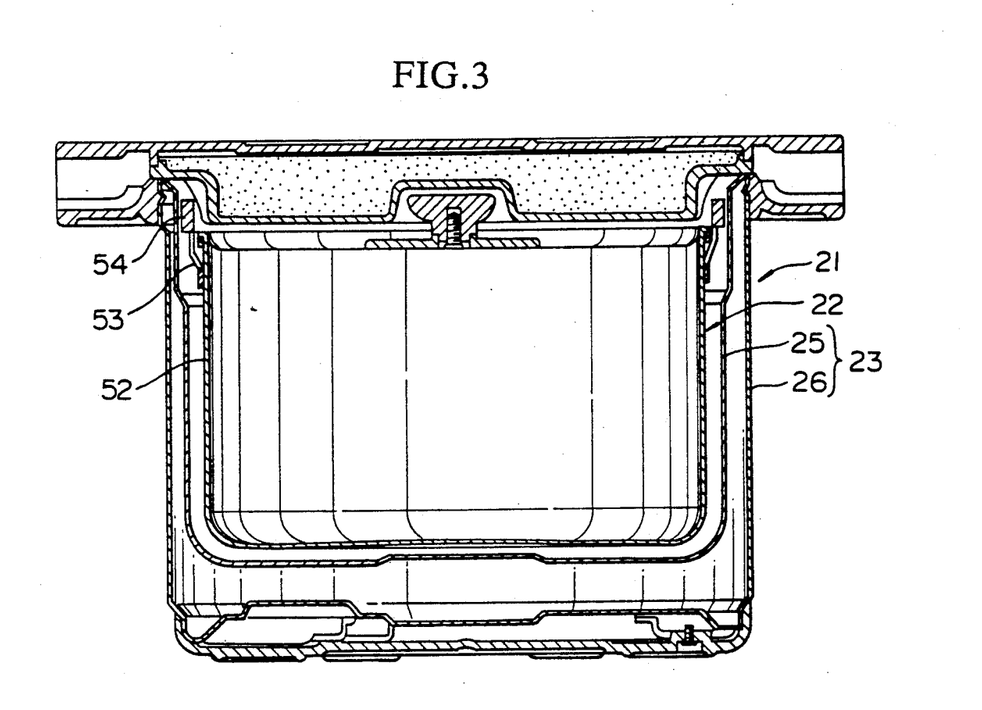
FIG. 3 is a cross sectional view of a heat insulating cooking vessel according to a third embodiment of the present invention.

FIG. 3 is a drawing for a third embodiment (Embodiment 3) of the present heat insulating cooking vessel.

This embodiment differs from Embodiment 1 in that a shorter tang portion made of stainless steel is located in the vicinity of the upper edge of an inner pot body 52 made of clad steel in such a way that the tip of the tang portion is positioned above the upper edge of the inner pot body 52. The tip of the tang portion 53 has a grip portion 54 made of thermosetting resin, so that the tang portion 53 and the grip portion 54 can be housed in the heat insulating container 21 when the inner pot 22 is housed in the heat insulating container 21.

In addition, the smaller diameter mouth part 45 is not formed on the upper edge of the inner pot body 52, but instead the upper portion of the inner bottle 25 in the outer container 23 is bent toward the outer bottle 26 to form a space to house the handle grip portion 53.

This embodiment provides approximately the same effect as Embodiment 1.

EMBODIMENT 4

Figure 4:
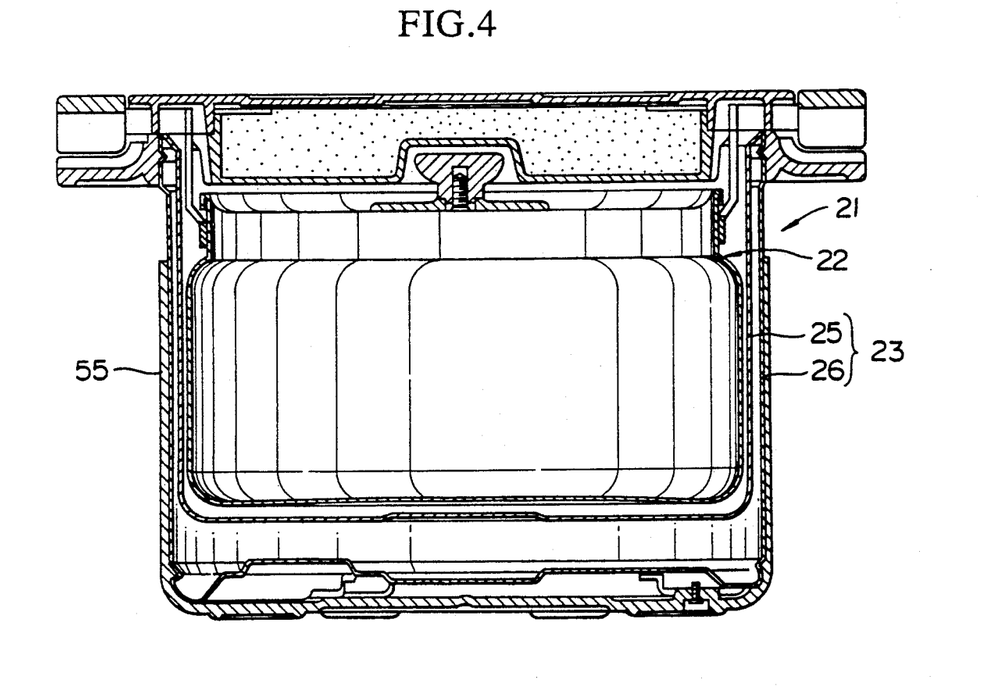
FIG. 4 is a cross sectional view of a heat insulating cooking vessel according to a fourth embodiment of the present invention.

FIG. 4 is a drawing for a fourth embodiment (Embodiment 4) of the present heat insulating cooking vessel.

This embodiment differs from Embodiment 1 in that the bottom member 55 of the heat insulating container 21 is made from synthetic resin, and the bottom member 55 extends to the upper portion of the outer wall of the outer container 23 to cover the outer wall of the outer container 23 by this extended portion.

Since the bottom member 55 is free from heat application, its material need not be limited to heat-resistant resin. General purpose synthetic resin such as polyethylene, polypropylene, polyvinyl chloride, and the like can be used.

This embodiment provides the same effect as Embodiment 1. In addition, the use of synthetic resin in the bottom member 55 of the heat insulating container 21 greatly facilitates coloration of the bottom member 55 and increases the design variations. At the same time, by applying to the bottom member 55 colors and patterns which can make the heat-cooking vessel easily identifiable from other vessels, it is possible to prevent through visual means the heat insulating container 21 from being inadvertently subjected to direct heating.

Furthermore, the use of synthetic resin in the bottom member 55 can prevent a table top or table cloth from being scratched when the heat insulating container 21 is placed on the table.

Moreover, by extending the bottom member 55 so as to cover the outer wall of the outer container 23, a finish polishing process of the outer container 23 can be omitted. Thus the polishing cost is reduced, resulting in reduced production costs.

EMBODIMENT 5

Figure 5:
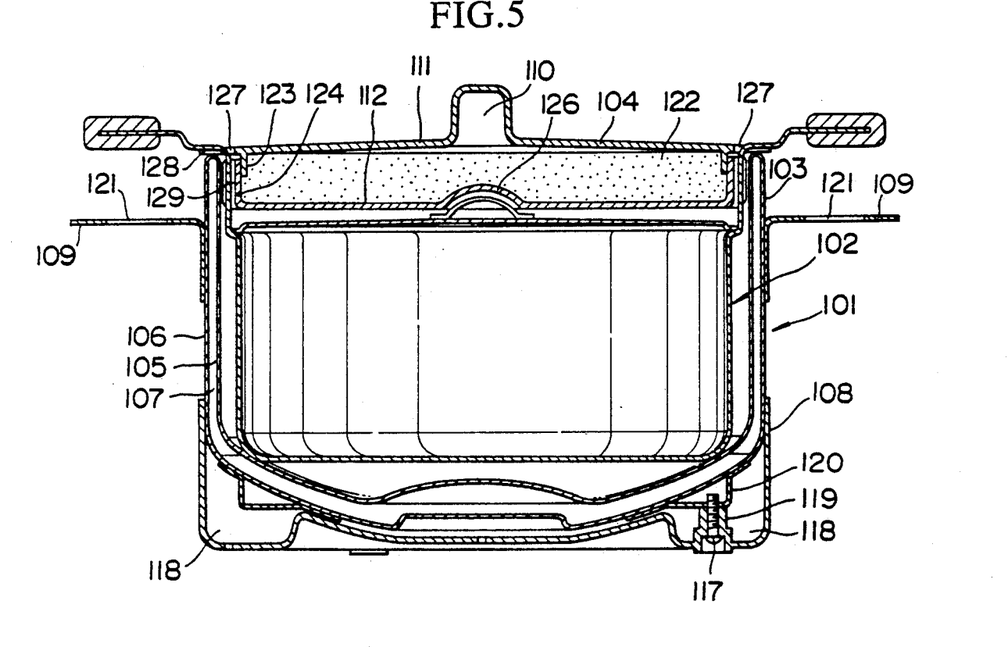
FIG. 5 is a cross sectional view of a heat insulating cooking vessel according to a fifth embodiment of the present invention.

FIG. 5 is a drawing for a fifth embodiment (Embodiment 5) of the present heat insulating cooking vessel.

The heat insulating cooking vessel of this embodiment summarily consists of a heat insulating container 101 and an inner container (inner pot 102) detachably housed in the heat insulating container 101, the heat insulating container 101 being formed with a heat insulating lid member (lid portion 104) enclosed in an outer container (container portion 103).

The container portion 103 is composed of a metallic inner bottle 105 with a bottomed cylindrical shape, having a bottom with a concave semi-spherical shape with a convex portion formed on its center and a metallic outer bottle of approximately the same shape as the inner bottle 105 but with a larger diameter than that of the inner bottle 105. The inner bottle 105 and the outer bottle 106 form a dual wall structure being joined airtight at their respective openings. The clearance between the inner bottle 105 and the outer bottle 106 forms a heat insulating portion 107 made of a vacuum or filled with insulating material.

In addition, on the bottom face of the container portion 103, a bottom element 108 is attached with a screw 117, a screw hole 119 in the bottom element 108 and a screw receiver 120 provided in the outer bottle 106. Legs 118, 118 are provided on the bottom element 108 to prevent the container portion 103 from falling down. Container handles 109, 109 with grip holes 121, 121 on the center are located on the circumference of the container portion 103.

The heat insulating lid member 104 is composed of an upper lid element 111 of approximately disc shape, a lower lid element 112 of approximately disc shape and insulating material 122. The upper lid element 111 and the lower lid element 112 are coupled together by engaging a cylindrical upper engaging element 123 projecting outwardly from the vicinity of the circumference of the upper lid element 111, into a cylindrical lower engaging element similarly projecting outward from the vicinity of the circumference of the lower lid element 112. The space formed by the upper lid element 111 and the lower lid element 112 is filled with insulating material 122. At the center of the upper lid element 111 is formed a knob 110 of approximately rectangular parallel piped shape and projecting outward. At the center of the lower lid element 112 is formed a concave portion 126 to house a knob 125 of the inner pot lid portion 114.

Figure 6:
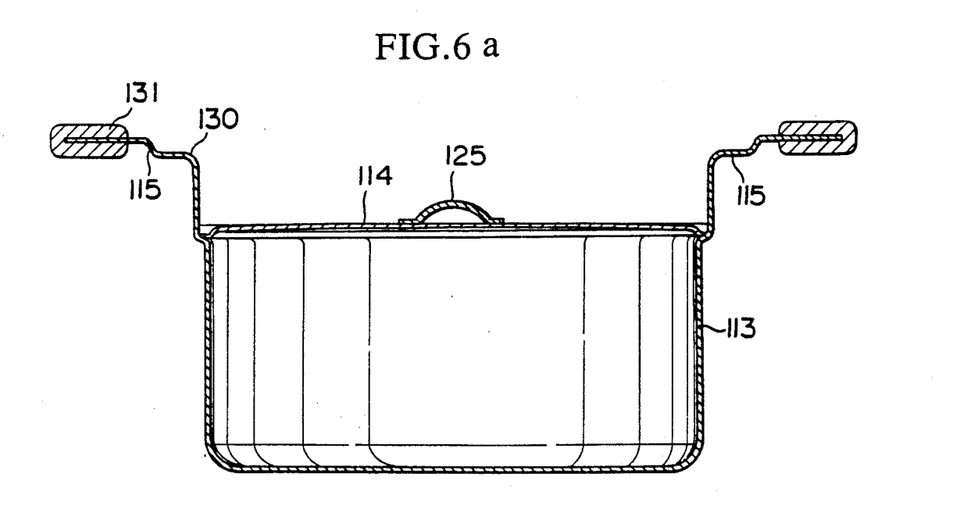
FIG. 6a is a cross sectional view of an inner pot of the heat insulating cooking vessel according to the fifth embodiment of the present invention shown in FIG. 5.
FIG. 6b is a top plan view of the heat insulating cooking vessel according to the fifth embodiment of the present invention shown in FIG. 5.
Figure 6B:
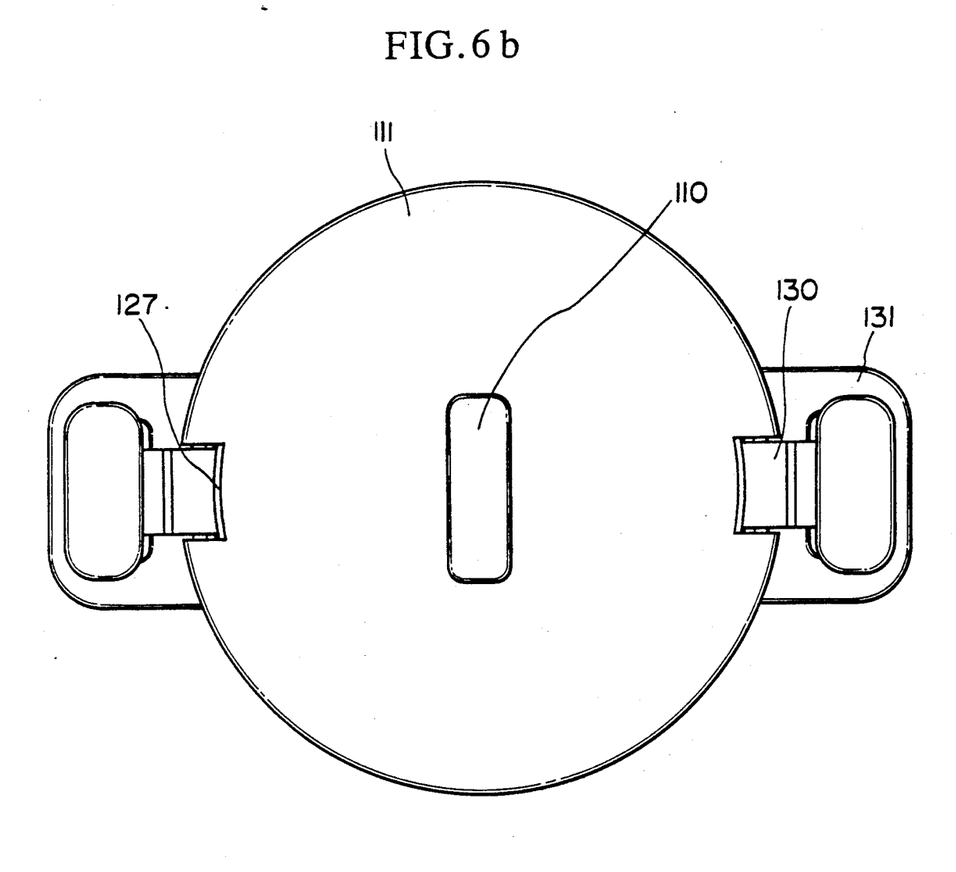

At one point on the circumference of the heat insulating lid member 104 and at another point corresponding to the other end of the circumferential diameter from the former point passing through the circumferential center of the heat insulating lid member 104, cut-out portions 127, 127 are made for a handle portion 115 to be taken out of the heat insulating container 101, as shown in FIG. 6b. The cut-out portion 127 consists of an upper lid cut-out portion 128 disposed in the upper lid element 111 and a lower lid cut-out portion 129 disposed in the lower lid element 112.

Next, an explanation is given of the inner pot 102 housed in the heat insulating container 101, referring to FIG. 6a.

The inner pot 102 summarily comprises an inner pot container 113, an inner pot lid portion 114 and a handle portion 115. At the opening portion of the inner pot container 113 is placed the disc-shaped inner pot lid portion 114 having a diameter approximately the same as that of the opening portion. At the center of the inner pot lid portion 114 is a knob 125 of a rectangular sheet material bent in an arc form. The metallic inner pot container 113 is a cylinder having a flat bottom, at the opening portion of which are handle portions 115, 115 on one point of the opening portion circumference and on another point corresponding to the other end of the diameter passing through the circumferential center of the opening portion. The handle portion 115 is composed of a tang portion 130 and a grip 131, one end of the tang portion 130 being bonded to the inner pot container 113 and the other end being disposed with a grip 131 made of thermosetting resin. The tang portion 130 is made of a rectangular metal sheet extending upward from the opening of the inner pot container 113 and perpendicularly bent at its halfway point radially outward of the opening portion circumference.

The inner pot 102 is, as shown in FIG. 5, supported by its flat bottom making contact in a ring with the inner wall rising from the concave spherical bottom of the heat insulating container 101. The lid portion 104 is disposed on the heat insulating container 101 in such a way that its cut-outs 127, 127 fit the handle portion 115.

In this embodiment, one can carry the inner pot 102 holding the grip 131 which is not heated because the grip 131 in the handle portion 115 is outside the heat insulating container 101 when the inner pot 102 is housed in the heat insulating container 101. In addition, because the grip 131 is made of a material having low heat conductivity, such as thermosetting resin and the like, the grip disposed on the tip of the tang portion 130 will not become too hot to carry even if the heat in the tang portion 130 is conducted. Furthermore, as the grip 131 is positioned above and radially outward of the inner pot container 113, the grip 131 will not be heated even if the inner pot 102 is subjected to direct heating by a stove, thereby enabling one to carry the inner pot 102 by holding the grip 131.

In addition, because the tang portion 130 is fixed onto the inner pot container 113, it is possible to set the inner pot 102 in place by holding down the grip 131. Furthermore, in putting the inner pot 102 in the heat insulating container 101 and taking out the inner pot 102 from the heat insulating container 101, as the handle portion 115 is fixed on the inner pot container 113, the inner pot 102 can be carried by holding the grip 131 without tilting the pot, preventing the inconvenience of having the cooking material in the pot spill out.

Furthermore, because the tang portion 130 of the handle portion 115 is bonded integrally with the inner pot container 113, no member projecting radially outwardly of the circumference of the inner pot container 113 is necessary, and the heat insulating container 101 can be structured with a diameter fitting that of the inner pot 102.

Although the grip 131 is made of thermosetting resin in the above-mentioned embodiment, the present vessel is not limited to material of this type. Any material, such as wood and the like, may be used as long as it has low heat conductivity. Also, while the handle portion 115 and the inner pot container 113 are bonded into one piece in the above-mentioned embodiment, any other method of bonding can be used in the present vessel, for example, riveting or welding, as long as no member projecting radially outward of the inner pot container 113 is used.

EMBODIMENT 6

Figure 7:
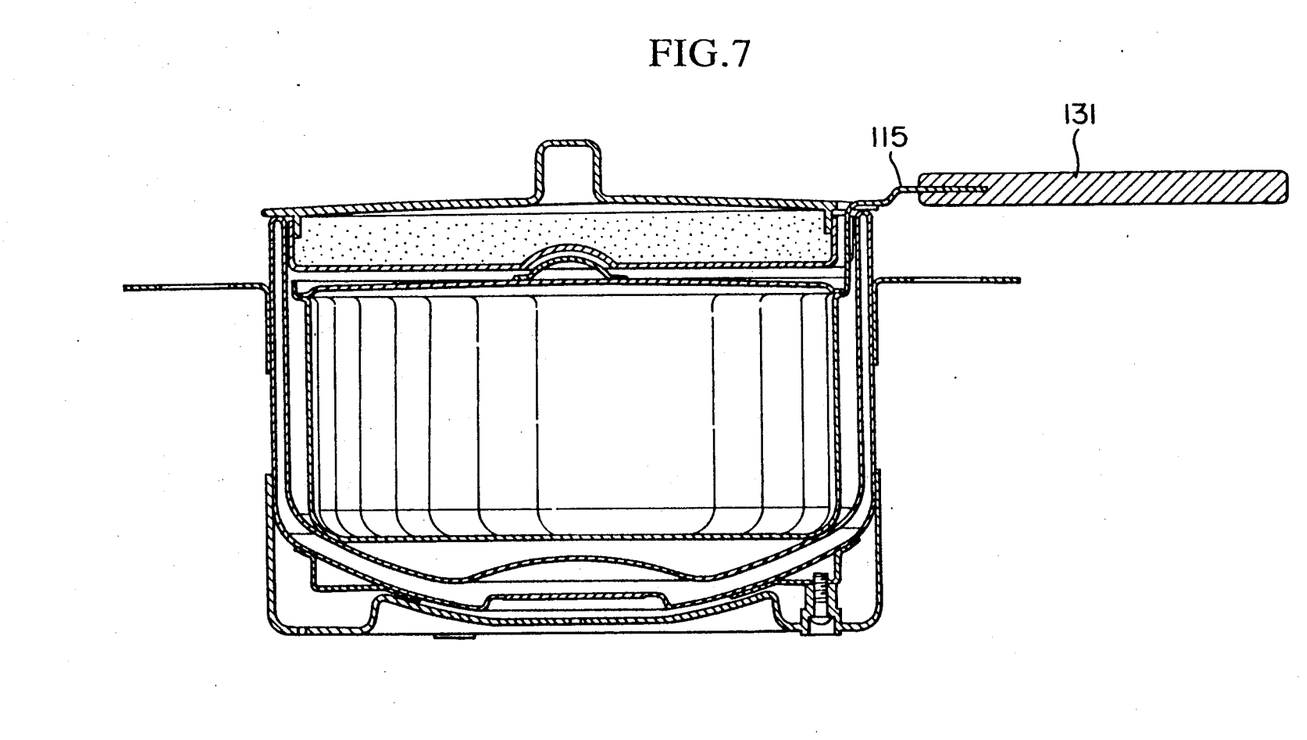
FIG. 7 is a cross sectional view of a heat insulating cooking vessel according to a sixth embodiment of the present invention.

FIG. 7 is a drawing for still another embodiment (Embodiment 6) of the present heat insulating cooking vessel.

This embodiment differs from Embodiment 5 in that only one handle portion 115 is used and this handle 131 is made longer than that of Embodiment 5.

This embodiment has the same effect as that of Embodiment 5, plus the advantage that one can carry the container with a single hand.

EMBODIMENT 7

Figure 8:
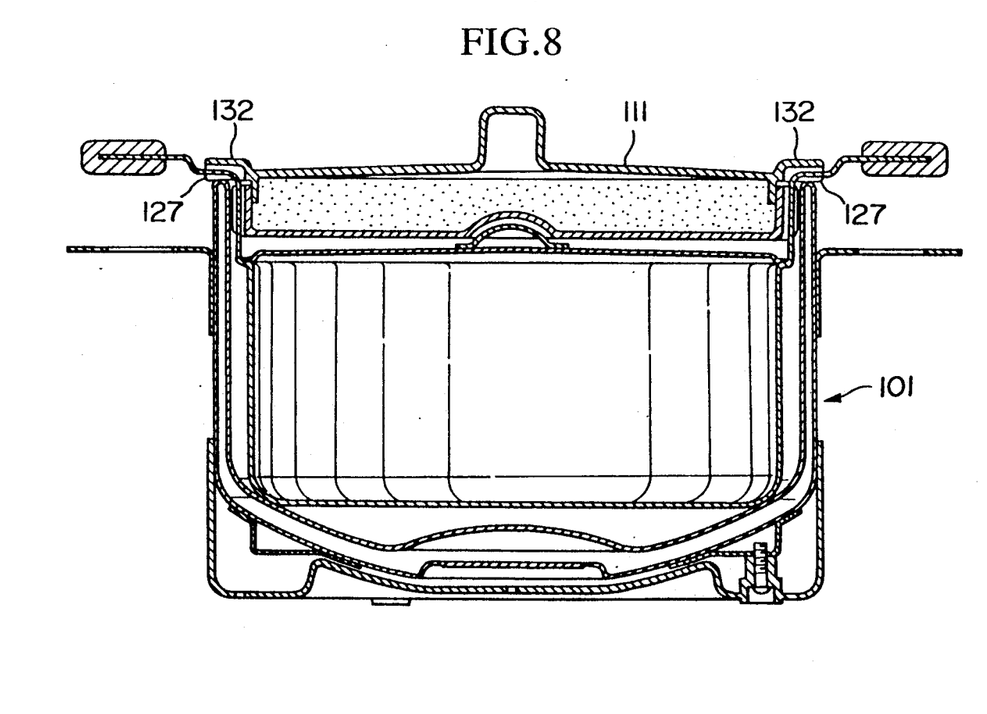
FIG. 8 is a cross sectional view of a heat insulating cooking vessel according to a seventh embodiment of the present invention.

FIG. 8 is a drawing for a seventh embodiment (Embodiment 7) of the present heat insulating cooking vessel.

This embodiment differs from Embodiment 5 in that a cover 132 is formed so as to cover the top of the cut-out portion 127 on the upper lid element 111.

This embodiment also has the same effect as Embodiment 5, and in addition, the insulating performance of the heat insulating container 101 is better than that in Embodiment 5.

EMBODIMENT 8

Figure 9:
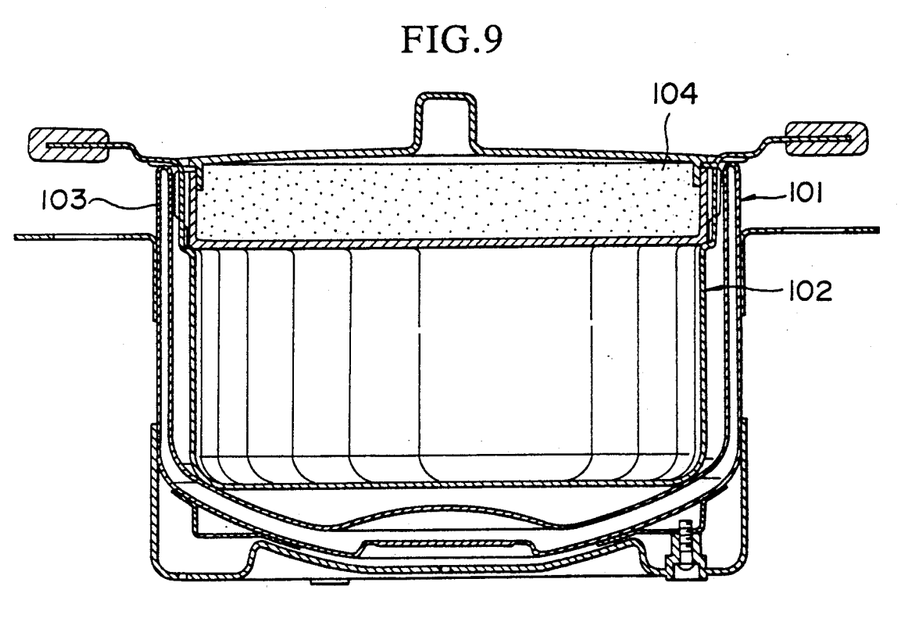
FIG. 9 is a cross sectional view of a heat insulating cooking vessel according to a eighth embodiment of the present invention.

FIG. 9 is a drawing for an eighth embodiment (Embodiment 8) of the present heat insulating cooking vessel.

This embodiment differs from Embodiment 5 in that a heat insulating lid member 104 is mounted in place of the inner pot lid portion 114 placed on the mouth part of the inner pot 102 in Embodiment 5. In addition, the heat insulating lid member 104 is enclosably disposed on the container portion 103.

EMBODIMENT 9

Figure 10:
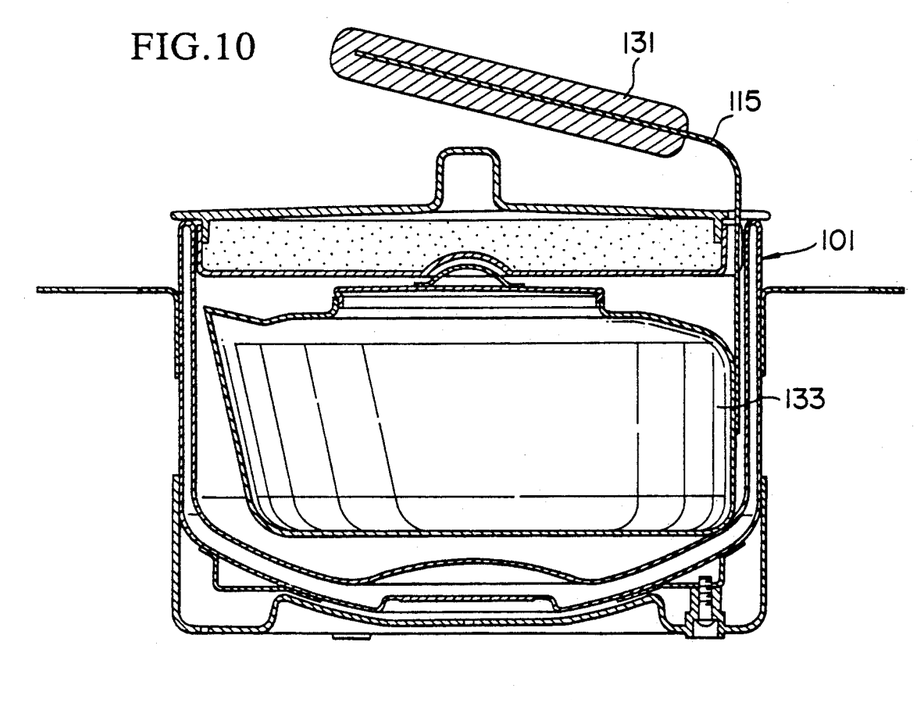
FIG. 10 is a cross sectional view of a heat insulating cooking vessel according to a ninth embodiment of the present invention.

FIG. 10 is a drawing for a ninth embodiment (Embodiment 9) of the present heat insulating cooking vessel.

This embodiment differs from Embodiment 5 in that the inner container housed in the heat insulating container 101 is changed from an inner pot 102 to a kettle 133. As a result, the shape of the handle portion 115 is changed so that the grip 131 comes above the kettle 133.

What is claimed is:

1. A heat insulating cooking vessel including a heat insulating outer container having an opening portion, an inner container releasably housed in the outer container, the inner container having an opening portion, and a side wall, and a heat insulating lid member for closing the opening portion of the outer container when the inner container is housed in the outer container, the heat insulating cooking vessel comprising:

at least one handle disposed on the side wall of the inner container, the handle being composed of a tang portion extending upward and having a tip, and a grip portion arranged on the tip of the tang portion above the opening portion of the inner container;

wherein the inner container is formed shallower than the outer container so that the inner container is positioned below the opening portion of the outer container when housed in the outer container; and wherein the heat insulating lid member of the outer container is provided with at least one cutout into which the handle can be inserted, the heat insulating lid member being releasably disposed to the opening portion of the outer container so that a lower face of the heat insulating lid member is positioned adjacent to the opening portion of the inner container and below the opening portion of the outer container.

2. A heat insulating cooking vessel as recited in claim 1, in which the handle disposed on the side wall of the inner container extends upward so that the tip of the tang portion is positioned outward of the opening portion of the outer container.

3. A heat insulating cooking vessel as recited in claim 1, in which the inner container has a reduced diameter portion formed adjacent to the opening portion thereof, the handle being secured to the reduced diameter portion.

4. A heat insulating cooking vessel as recited in claim 1, in which the grip is made of low heat conductive material selected from the group consisting of synthetic resin and wood.

5. A heat insulating cooking vessel as recited in claim 1, in which the inner container has a lid for closing the opening portion of the inner container.

6. A heat insulating cooking vessel as recited in claim 1, in which the inner container is made of metal or enameled material which can be subjected to heating, in which the heat insulating outer container consists of a dual wall composed of an inner bottle and an outer bottle having an outer wall and a bottom, the inner bottle and the outer bottle being made of metal, and in which further comprising a cover of synthetic resin material disposed at least at the bottom of the outer wall of the outer bottle.

* * * * *